Figure 1:
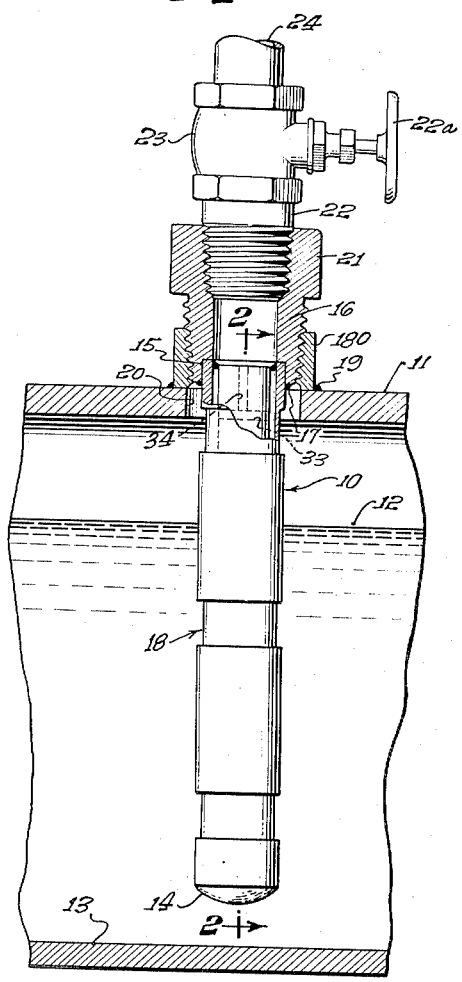

Sept. 18, 1956

J. A. CAMPBELL 2,763,534

CORROSION DETECTOR

Filed July 22, 1954

JULIAN A. CAMPBELL,
INVENTOR.

BY

ATTORNEY.

United States Patent Office 2,763,534
Patented Sept. 18, 1956

2,763,534

CORROSION DETECTOR

Julian A. Campbell, Long Beach, Calif.

Application July 22, 1954, Serial No. 444,941

4 Claims. (Cl. 23—253)

This invention relates to improvements in corrosion detectors, and more particularly is directed to means for preventing the loss of corrodable elements which are connectible into hollow fluid containing bodies and of the type disclosed in my copending application Serial No. 377,474, filed August 31, 1953, on "Corrosion Detectors."

In the past, corrosion detectors have been made comprising elongated rods or tubes which are connectible into fluid containing bodies and in which they are subject to corrosion arising from chemical action of fluids on the corrodable portions of the detectors. A typical detector comprises an essentially tubular structure having a closed end in contact with the fluid in the hollow body, and which contains a fluid passage for conducting fluid to the exterior of the hollow body to indicate a certain degree of corrosion. For this purpose, the tube shank contains one or more annularly reduced portions of thinner wall construction and of known dimension adapted to corrode through so as to allow escape of fluid from the interior of the hollow body into the tube and to the exterior.

It has been found that detectors having such a tubular construction are subject to more or less equal corrosion rates, so that when the reduced wall portion of the tube corrodes through at one point, corrosion of the remainder of the annular reduced wall portion has generally progressed to such a degree that only a very thin wall section remains. If the detector is not then removed from the hollow body, corrosion of the remaining thin wall section will continue until complete destruction occurs in a short period, resulting in the loss of the inner end of the detector and probable damage to valves and other structure in the hollow body or pipe downstream from the detector insertion point. Similar difficulties with ordinary rod-type detectors are also encountered; it being found that a rod may corrode completely through at a point between its ends before the inner end of the rod is destroyed, and resulting in the loss of that end into the fluid line.

The major object of the present invention is to provide a means for precluding the loss of detectors in fluid lines or fluid containing bodies, resulting from corroding through of such detectors at points between their ends. Particularly contemplated is a device adapted to retain and support the inner end of such a detector in such a way that it cannot drop into the fluid line, upon complete corroding through of the shank of the detector.

A particularly advantageous feature of the invention is the provision for joining the inner end of the tubular detector to the means connecting the detector into the wall of the hollow body or pipe, so as to give support to the tube at its inner and outer ends within the hollow body and also allow the detector and its support to be removed as a unit from the hollow body. A further refinement of the invention consists in running a supporting rod inside the tubular detector so that it is not itself subject to corrosion until the tube begins to leak. The rod may be joined to the closed inner and outer ends of the tubular detector to give it support at opposite ends, in which case the outer end of the rod may be apertured to provide a passage allowing fluid leakage from the interior of the tube to the exterior of the hollow body, upon corroding through of the tube wall.

Figure 2:
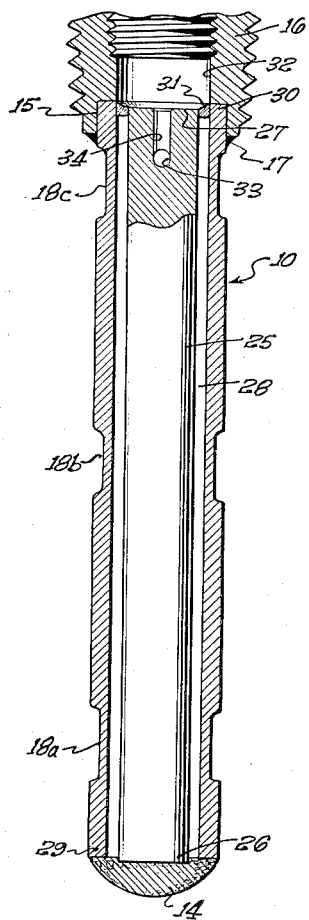

The above and other features and objects of the present invention will be better understood from the following detailed description of the typical embodiments illustrated in the accompanying drawings in which:

Fig. 1 is a partially sectional view of a first form of corrosion detector and support embodying the invention; and Fig. 2 is an enlarged sectional view of the detector and support;

Referring first to Fig. 1, I have shown at 10 a corrosion detector element which is connected to a pipe 11 through which a fluid 12 flows. The purpose of the corrosion detector is to indicate the extent to which the inner surface 13 of pipe 11 has probably corroded after being in use for a considerable period of time. Detector element 10 is tubular as shown, and has a closed lower end 14. At its upper end, element 10 is suitably mounted in an annular groove 15 in a mounting head 16 and fastened into position by annular weld 17. The mounting head 16 is externally threaded and removably connectible into an internally threaded adapter 180 which is welded at 19 to the outer surface of the pipe and centrally located over a bore 20 in the pipe wall.

The mounting head 16 has an upper externally polygonal portion 21 engageable with a wrench for connecting the detector element into and removing it from the pipe wall. Threadedly connected into the upper end of head 16 is a tubular pipe nipple 22, to which is connected a conventional valve unit 23 controlled by a rotary actuating handle 22a. Opposite the valve nipple 22 is the valve outlet 24 from which fluid passes when the valve is open. Referring now to the enlarged view of the detector shown in Fig. 2, it will be seen that the tubular element 10 is externally and internally cylindrical along most of its extent, and has at least one and preferably several externally reduced diameter annular portions 18, such as 18a, 18b, and 18c. At these locations the wall thickness of element 10 is considerably reduced, being typically between about .020 inch and .060 inch. As will be understood, the reduced thickness portions become corroded through long before corrosion has substantially reduced the wall thickness of pipe 11.

In order that the corrosion of reduced portion 18 may proceed at a rate corresponding to the rate of corrosion of pipe 11, element 10 is preferably formed of a material having substantially identical corrosion characteristics as pipe 11, as regarding corrosion by the particular fluid 12 being handled. For example, if pipe 11 is formed of steel of a particular composition, detector element 10 is formed of a similar steel which has been treated in identically the same manner.

Centrally positioned within the tubular element 10 is supporting rod 25 having an inner or lower end 26 and an outer or upper end 27. The rod 25 has a diameter somewhat smaller than the inner diameter of the tube 10, in order that a cylindrical space 28 adjacent the inner walls of the tube may be provided throughout the length of the tube. The lower end 26 of the rod extends slightly below the lower end 29 of the tube, in order that the two lower ends may be joined together as by the dome-shaped weld 14 comprising the closed lower end of the tube. Upper end 27 of the rod lies slightly within the upper end 30 of the tube and is joined thereto by a ring-shaped weld 31 which is dished inwardly from the end of the tube. This construction allows the upper end 30 of the tube to be seated or shouldered within the annular groove 15 provided in the lower end of the mounting head 16. The latter contains a bore 32 communicating between the upper end 27 of the rod and the nipple 22.

As shown in Figs. 1 and 2 the upper end of rod 25 is transversely bored at 33 across a diameter to communicate with the passage 28 on opposite side of the rod. In addition, an axial bore 34 in the end of the rod communicates between bore 33 and bore 32 in the mounting head 16. Bores 33 and 34 provide passages allowing egress of fluid from passage 28 in the detector to the exterior of the pipe 11 via bore 32 in the mounting head and valve 23, when open.

When detector element 10 is connected into pipe 11 in the manner shown, the element is directly exposed to liquid 12 as well as any gas contained in the pipe above the liquid and is therefore subject to corrosion at the same rate as the inner surface 13 of the pipe wall. The first portions of the element 10 to corrode entirely through are one or more of the thin reduced diameter portions 18 of the detector. Upon such corrosion, the fluid within pipe 11 leaks into the passage 28 within the element 10 from where it escapes upwardly into bore 32 via the passages 33 and 34. Valve 23 is of course normally maintained in closed condition, so that fluid leaking into the element is not able to escape outward. At periodic intervals, an operator opens valve 23 to place the interior passage 28 in element 10 in communication with the outlet 24. If any fluid then flows upwardly past valve 23, the operator knows that one of the reduced thickness portions 18 has corroded through, thus indicating that the interior of pipe 11 has probably corroded to the same extent.

In general, corrosion of each of the areas 18 will proceed at the same rate when the pipe 11 is filled with liquid 12, and it will be observed that when one or more of these portions have corroded through at one point, the remaining annular area of that portion will be corroded to such an extent that only a very thin section remains. Thereafter, if the detector is allowed to remain inserted or connected within the pipe 11, corrosion will continue to the point where one or more of the portions 18 will become corroded through and around an annular area, and were it not for the presence of the supporting rod 25, the lower end of the detector beneath the corroded through portion 18 would drop into the pipe and be carried downstream by the fluid. The supporting rod 25 does not begin to corrode until the detector 10 has sprung a leak, and therefore it continues to support the detector from its lower end 14 for a very long period of time after the detector has corroded entirely through around an annular area 18. The rod effectively prevents loss of the lower end of the detector and allows the latter to be conveniently removed from the pipe.

I claim:

1. Apparatus for installation on, and for detecting and indicating the extent of probable corrosion of inaccessible inner wall surfaces of, a closed hollow body containing fluid corrosive to such surfaces, comprising: an elongated tubular element having a closed end and an open end and being of a size to be insertable closed end foremost through an opening in a wall of the body, said element having between said ends a circumferential wall portion corrodible in the fluid and of reduced predetermined constant thickness for exposure of its exterior surface to the corrosive fluid contained within the body, the thickness of said wall portion being less than that of the body walls; means on said element for detachably securing the latter to the body and for providing a seal between said element and the edges of the body opening; valve means connected to said element open end for disposition exteriorly of the body, whereby the opening of said valve means will indicate, by passage or non-passage of fluid therefrom, whether said wall portion has become corroded away sufficiently to pass fluid therethrough into the interior of said element and out through said valve means; and support means within said element, longitudinally bridging said circumferential wall portion out of contact therewith, and secured to said element on opposite sides of said wall portion while permitting any fluid passed through said wall portion to flow to said open end for communication with said valve means, whereby in the event that said wall portion corrodes sufficiently to cause complete separation of the element portions on opposite sides thereof, said support means will prevent loss into the body of the element portion adjacent said closed end.

2. The structure defined in claim 1 in which the support means comprises an elongated member secured at its opposite ends to the element closed end and the element open end and extending therebetween in spaced relationship to the side walls of the element, said support means having a passageway therethrough providing communication between the valve means and the space between said support means and said element side walls.

3. In apparatus of the type described, the combination comprising: a closed hollow body having inaccessible inner wall surfaces and containing fluid corrosive to said surfaces, said body having an opening in a wall thereof; an elongated tubular element having a closed end and an open end, said element being of a size to be insertable closed end foremost through said body opening and having between said ends a circumferential wall portion corrodible in the fluid and of reduced predetermined constant thickness for exposure of its exterior surface to the corrosive fluid contained within said body, the thickness of said element wall portion being less than that of the walls of said body; means on said element detachably securing the latter to said body and providing a seal between said element and the edges of said body opening; valve means connected to said element open end exteriorly of said body, whereby the opening of said valve means will indicate, by passage or non-passage of fluid therefrom, whether said wall portion has become corroded away sufficiently to pass fluid therethrough into the interior of said element and out through said valve means, thereby providing an indication of the extent of probable corrosion of said inner wall surfaces of said body; and support means within said element, longitudinally bridging said circumferential wall portion out of contact therewith, and secured to said element on opposite sides of said wall portion while permitting any fluid passed through said wall portion to flow to said open end for communication with said valve means, whereby in the event that said wall portion corrodes sufficiently to cause complete separation of the element portions on opposite sides thereof, said support means will prevent loss into said body of the element portion adjacent said closed end.

4. The structure defined in claim 3 in which the support means comprises an elongated member secured at its opposite ends to the element closed end and the element open end and extending therebetween in spaced relationship to the side walls of the element, said support means having a passageway therethrough providing communication between the valve means and the space between said support means and said element side walls.

UNITED STATES PATENTS

References Cited in the file of this patent

| | | |
|---|---|---|
| 425,369 | Cowell | Apr. 9, 1890 |
| 1,313,627 | Flannery | Aug. 19, 1919 |
| 1,913,564 | Raymond | June 13, 1933 |
| 2,270,389 | Straub | Jan. 20, 1942 |
| 2,519,323 | Shank | Aug. 15, 1950 |